(12) United States Patent
Sobanski et al.

(10) Patent No.: US 12,352,442 B1
(45) Date of Patent: Jul. 8, 2025

(54) COMBUSTOR PANEL WITH RAIL INTEGRATED PERIMETER STUDS

(71) Applicant: RTX Corporation, Farmington, CT (US)

(72) Inventors: Jon Sobanski, Glastonbury, CT (US); Steven Porter, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/760,497

(22) Filed: Jul. 1, 2024

(51) Int. Cl.
F23R 3/00 (2006.01)
F02C 7/18 (2006.01)

(52) U.S. Cl.
CPC ............. F23R 3/005 (2013.01); F02C 7/18 (2013.01); F23R 3/002 (2013.01); F23R 2900/00017 (2013.01)

(58) Field of Classification Search
CPC ................. F23R 3/002; F23R 2900/00017
See application file for complete search history.

(56) References Cited

U.S. PATENT DOCUMENTS

| | | | |
|---|---|---|---|
| 5,758,503 A * | 6/1998 | DuBell | F23R 3/002 60/752 |
| 6,701,714 B2 | 3/2004 | Burd et al. | |
| 9,950,382 B2 | 4/2018 | Stastny et al. | |
| 11,015,807 B2 | 5/2021 | Lao | |
| 2013/0247575 A1* | 9/2013 | Patel | F23R 3/04 60/752 |
| 2014/0230440 A1 | 8/2014 | Summers | |
| 2015/0052901 A1* | 2/2015 | Davenport | F23R 3/007 60/752 |
| 2017/0159935 A1* | 6/2017 | Drake | F02C 7/18 |
| 2018/0128485 A1* | 5/2018 | Eastwood | F23R 3/002 |
| 2018/0252413 A1* | 9/2018 | Clemen | F23R 3/002 |
| 2019/0242580 A1* | 8/2019 | Porter | F23R 3/50 |
| 2019/0249873 A1* | 8/2019 | Porter | F23R 3/002 |
| 2019/0257248 A1* | 8/2019 | Sobanski | F23R 3/06 |
| 2020/0003423 A1* | 1/2020 | Porter | F23R 3/26 |
| 2020/0041126 A1* | 2/2020 | Anderson | F23R 3/005 |

* cited by examiner

*Primary Examiner* — Thomas P Burke
(74) *Attorney, Agent, or Firm* — Kinney & Lange, P.A.

(57) ABSTRACT

In one aspect, a panel for lining a combustor shell of a combustor of a gas turbine engine includes a front surface configured to face a combustion chamber and a back surface configured to face the combustor shell, a plurality of cooling holes extending from the back surface to the front surface, a rail extending from the back surface and defining a perimeter of the panel, and a plurality of studs disposed adjacent to and connected to the rail. The rail is configured to contact the combustor shell. The plurality of studs are configured to be received in a plurality of holes of the combustor shell. The plurality of studs is asymmetrically arranged around the perimeter of the panel.

8 Claims, 7 Drawing Sheets

COMBUSTOR PANEL WITH RAIL INTEGRATED PERIMETER STUDS

BACKGROUND

The present disclosure is directed generally to combustors for gas turbine engines and, more particularly, to combustor panels for double wall combustors.

Combustors of gas turbine engines generally include combustor panels attached to a combustor shell and configured to interface with hot combustion gases. Combustor panels often include studs for fastening the panels to the combustor shell. The studs are received through holes in the combustor shell and fastened thereto with a nut. The holes in the combustor shell need to be oversized to accommodate thermal growth and manufacturing tolerances. Standoff pins or features configured to contact the shell upon assembly are required around each stud to react out the stud load against the combustor shell. The shell holes, studs, and standoff pins or other load-bearing features create a zone of dirt accumulation, which can reduce cooling effectiveness, leading to degradation of the panels at the stud locations.

SUMMARY

In one aspect, a panel for lining a combustor shell of a combustor of a gas turbine engine includes a front surface configured to face a combustion chamber and a back surface configured to face the combustor shell, a plurality of cooling holes extending from the back surface to the front surface, a rail extending from the back surface and defining a perimeter of the panel, and a plurality of studs disposed adjacent to and connected to the rail. The rail is configured to contact the combustor shell. The plurality of studs are configured to be received in a plurality of holes of the combustor shell. The plurality of studs is asymmetrically arranged around the perimeter of the panel.

In another aspect, a combustor of a gas turbine engine includes a support shell and a plurality of panels mounted to the support shell. The support shell includes an inner surface, outer surface, and mounting holes extending therebetween. Each panel includes a front surface facing a combustion chamber and a back surface facing the inner surface of the support shell, a plurality of cooling holes extending from the back surface to the front surface, a rail extending from the back surface and defining a perimeter of the panel, and a plurality of studs disposed adjacent to and connected to the rail. The rail is configured to contact the inner surface of the support shell. The plurality of studs is received in the plurality of mounting holes of the support shell and is fixed to the outer surface of the support shell by a plurality of nuts. The plurality of studs is asymmetrically arranged around the perimeter of the panel.

The present summary is provided only by way of example, and not limitation. Other aspects of the present disclosure will be appreciated in view of the entirety of the present disclosure, including the entire text, claims and accompanying figures.

Figure 1:
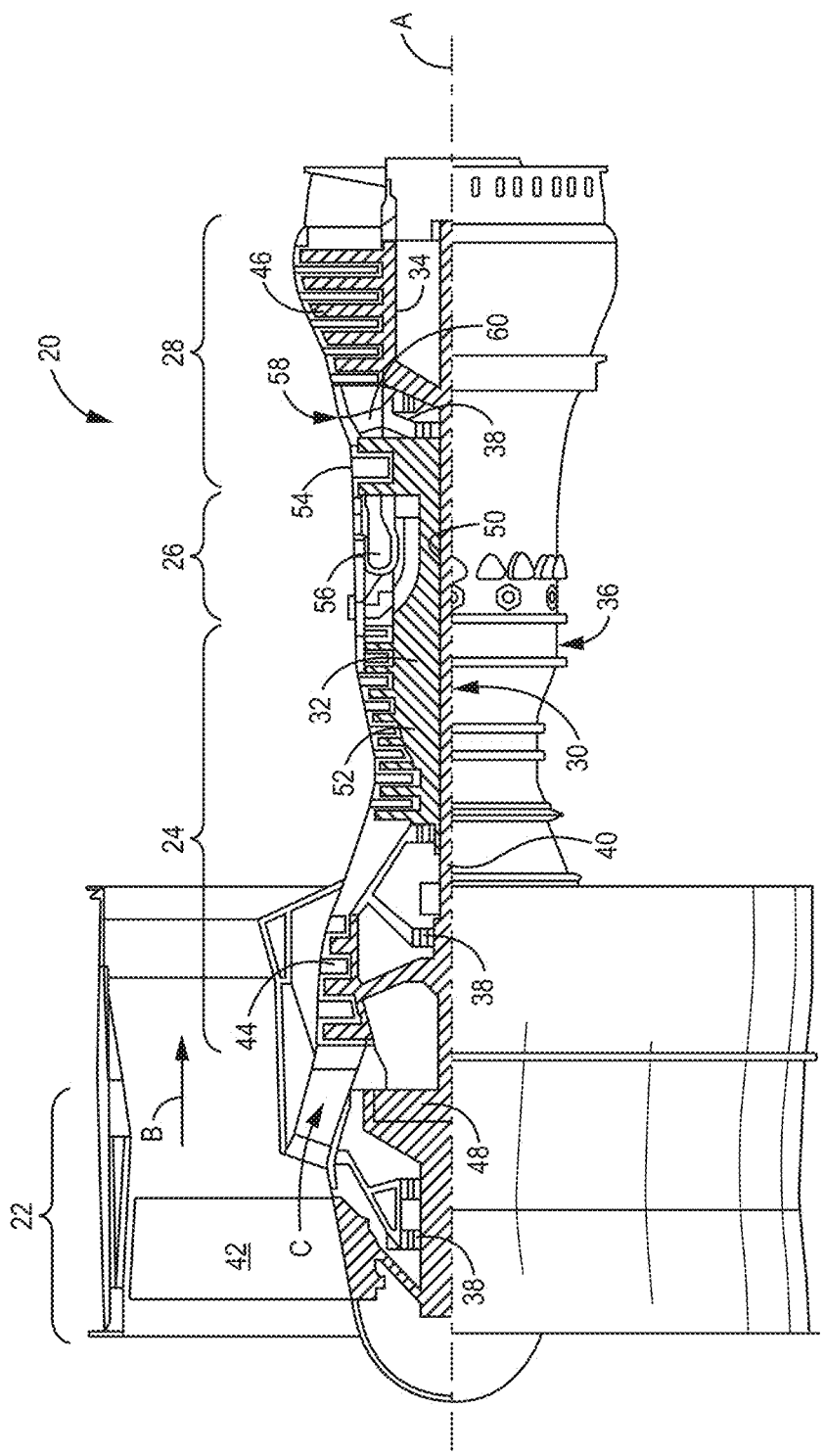
FIG. 1 is a quarter-sectional view of a gas turbine engine.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

FIG. 1 is a quarter-sectional view of gas turbine engine 20 that includes fan section 22, compressor section 24, combustor section 26, and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high-pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor (HPC) 52 and high pressure turbine 54. In one example, high pressure turbine 54 includes at least two stages to provide a double stage high pressure turbine 54. In another example, high pressure turbine (HPT) 54 includes only a single stage. As used herein, a "high pressure" compressor or turbine experiences a higher pressure than a corresponding "low pressure" compressor or turbine.

A mid-turbine frame 58 of engine static structure 36 can be arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes airfoils/vanes 60, which are in the core airflow path and function as an inlet guide vane for low pressure turbine 46. Utilizing vanes 60 of mid-turbine frame 58 as inlet guide vanes for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
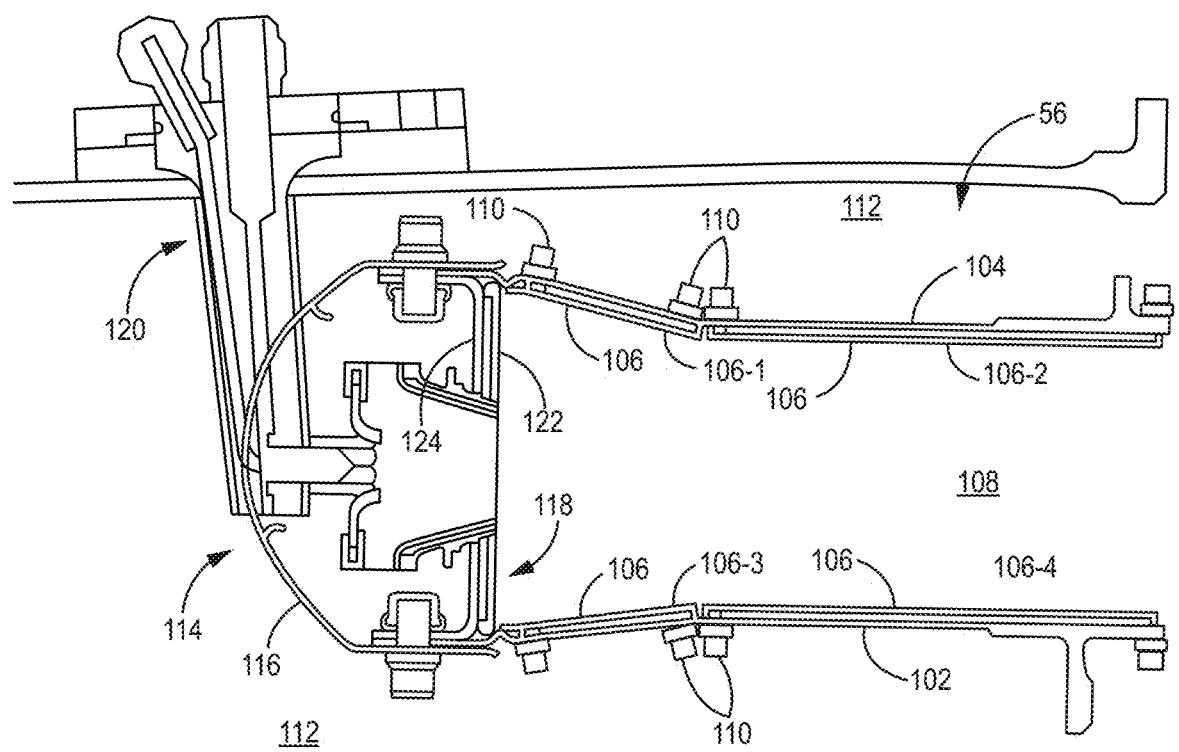
FIG. 2 is a cross-sectional view of a combustor of a gas turbine engine.

FIG. 2 is a cross-sectional view of combustor 56 of gas turbine engine 20. Combustor 56 has an annular wall assembly having inner shell 102 and outer shell 104, which support a plurality of respective inner and outer panels 106 (e.g., thermal shields, combustor liners). Panels 106 can collectively define an annular combustion chamber 108 of combustor 56. Combustor inner shell 102 and outer shell 104 can be annular bodies, formed, for example, of a wrought sheet metal nickel alloy. Combustor inner and outer shells 102, 104 provide structural support to panels 106.

Panels 106 are mounted to inner and outer shells 102, 104 by attachment features 110. Each panel 106 can comprise a partial cylindrical or conical surface section. Panels 106 can include, for example, a plurality of forward panels 106-1 and a plurality of aft panels 106-2 defining an outer diameter of combustion chamber 108, and a plurality of forward panels 106-3 and a plurality of aft panels 106-4 defining an inner diameter of combustion chamber 108. As used herein, "aft" refers to the direction associated with the exhaust (e.g., the back end) of a gas turbine engine. As used herein, "forward" refers to the direction associated with the intake (e.g., the front end) of a gas turbine engine. Annular rows of circumferentially segmented panels 106 can be mounted to inner and outer shells 102, 104 to thermally shield inner and outer shells 102, 104 from high temperature flames and/or combustion gases. The plurality of panels 106 can be disposed to substantially cover a combustion chamber-facing surface of inner and outer shells 102 and 104. Panels 106 can be made of any suitable heat tolerant material. In various embodiments, panels 106 can be made, for example, from a high-performance nickel-based super alloy. Panels 106 can be formed of a cast single crystal alloy. Panels 106 can be formed by an investment cast method or multi-step wax injection cast method, as known in the art.

Cooling plenums 107 are defined between the respective inner and outer shells 102, 104 and combustor panels 106 for supplying cooling air to panels 106. Impingement holes (not shown) are located in inner and outer shells 102, 104 to supply the cooling air from an outer air plenum or diffuser chamber 112 into cooling plenums 107.

Combustor 56 further includes a forward assembly 114 immediately downstream of compressor section 24. Forward assembly 114 generally includes an annular hood 116, bulkhead assembly 118, and a plurality of fuel nozzle assemblies 120. Bulkhead assembly 118 can include a plurality of bulkhead panels 122 (e.g., thermal shields, combustor liners) secured to an annular bulkhead support shell 124. Bulkhead assembly 118 is configured to receive the plurality of fuel nozzle assemblies. Annular hood 116 extends radially between, and is secured to, the forwardmost ends of inner shell 102 and outer shell 104. Annular hood 116 includes a plurality of circumferentially distributed ports that accommodate respective fuel nozzle assemblies 120.

FIGS. 3-8 illustrate various embodiments of panels 106. FIG. 9 illustrates a non-limiting embodiment of bulkhead panel 122. Each of the combustor panels and combustor assemblies disclosed herein have rail-integrated perimeter attachment studs designed to provide improved durability. While reference is made to panels 106 of combustor 56, it will be understood by one of ordinary skill in the art that the architecture of combustor 56 is one example of an annular double-wall combustor for a gas turbine engine and that the combustor panels described herein can be adapted for use in a variety of combustor designs. Furthermore, it should be understood by one of ordinary skill in the art that while specific reference is made to inner, outer, forward, and aft combustor panels, the teachings disclosed herein can be applied to any combustor panels, including combustor panels with varying configurations of dilution holes, injector holes, and cooling features (e.g., cooling holes, turbulators, etc.).

Figure 3:
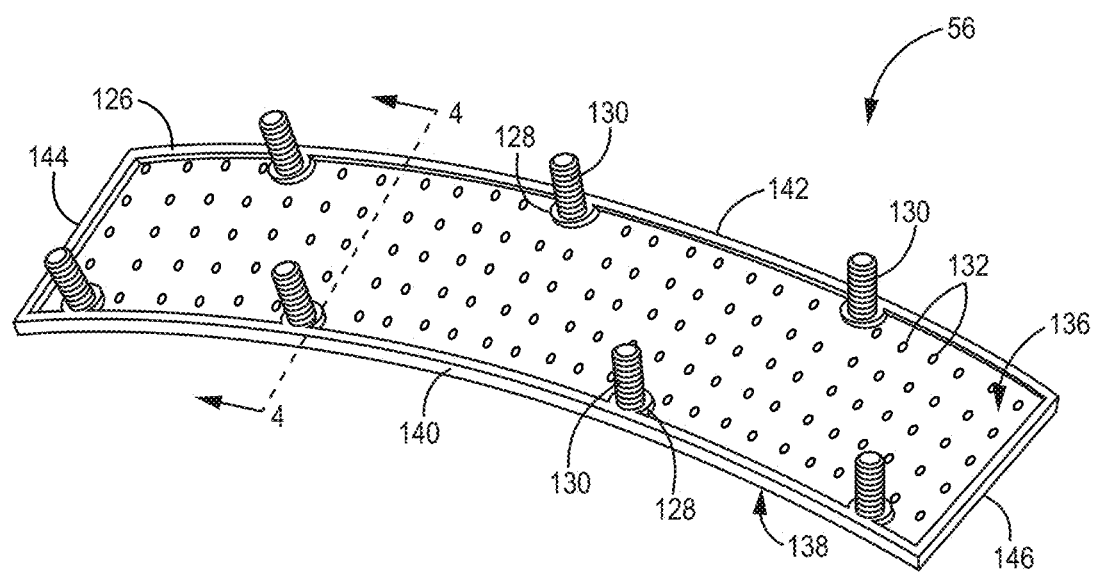
FIG. 3 is a perspective view of one example of a liner panel for a combustor of a gas turbine engine.
Figure 4:
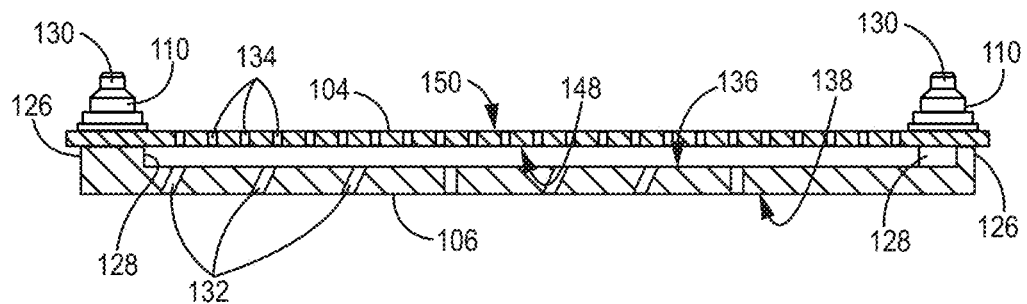
FIG. 4 is a schematic cross-sectional view of the combustor liner panel taken along the 4-4 line of FIG. 3 and assembled with a combustor shell to form a portion of a combustor.

FIG. 3 is a perspective view of a combustor panel 106 according to one embodiment of the present disclosure. FIG. 4 is a cross-sectional view of a portion of combustor 56 having panel 106 mounted to outer shell 104. FIG. 3 shows panel 106, perimeter rail 126, bosses 128, studs 130, and film cooling holes 132. FIG. 4 shows panel 106, perimeter rail 126, bosses 128, studs 130, film cooling holes 132, outer shell 104, impingement cooling holes 134, and attachment feature 110. FIGS. 3 and 4 are discussed together herein.

Panel 106 includes cold (or back) side surface 136, hot (or front) side surface 138, forward end 140, aft end 142, and opposing circumferential ends 144 and 146. Outer shell 104 includes inner surface 148 and outer surface 150. Panel 106 is one of multiple liner segments configured to be mounted to inner surface 148 of outer shell 104 as shown in FIG. 4 with hot side surface 138 arranged to face combustion chamber 108 (shown in FIG. 2). Panel 106 can be, for example, a forward panel (e.g., 106-1) or aft panel (e.g., 106-2) configured to be combined with other panels 106, as known in the art, to thermally shield outer shell 104 from combustion chamber 108.

Cold side surface 136 of panel 106 is spaced from inner surface 148 of outer shell 104 to define cooling plenum 107 therebetween. Impingement cooling holes 134 are provided through outer shell 104 to provide cooling air to cooling plenum 107. Film cooling holes 132 are provided through panel 106 to provide film cooling of hot side surface 138. Film cooling holes 132 can be disposed at any of a variety of inclination and clock angles, as known in the art, and in any arrangement determined to provide a desired film cooling of panel 106.

Perimeter rail 126 extends from cold side surface 136 and defines a perimeter of panel 106, extending along forward end 140, aft end 142, and opposing circumferential ends 144 and 146. Perimeter rail 126 is configured to form a sealing interface with inner surface 148 of outer shell 104. A height of perimeter rail 126 can define a height of cooling plenum 107 formed between outer shell 104 and panel 106. In some examples, the height of perimeter rail 126 from cold side surface 136 can be around 0.100 inches (2.54 mm). A thickness of perimeter rail 126 can define a sealing surface area. The thickness of perimeter rail 126 can be selected to provide a desired sealing surface area. In some examples, the thickness of perimeter rail 126 can be around 0.060 inches (1.5 mm). In some examples, the thickness of perimeter rail 126 can be between 0.020 inches (0.51 mm) and 0.060 inches (1.5 mm) or greater than 0.060 inches (1.5 mm).

Studs 130 project outward from and perpendicular to cold side surface 136. Studs 130 can include threads configured to engage attachment features 110. Attachment features 110 can include, for example, a retention nut and washer as known in the art. Studs 130 are integrated with perimeter rail 126. As illustrated in FIG. 3, studs 130 are disposed adjacent to and connected to perimeter rail 126. An outer diameter of studs 130 can be disposed on a tangent of an interior edge of perimeter rail 126. Bosses 128 can be provided to locate studs 130 along perimeter rail 126. Bosses 128 are provided at a base of studs 130. Bosses 128 can surround or extend outward from studs 130 (e.g., having a perimeter extending beyond the diameter of studs 130). Bosses 128 extend outward from perimeter rail 126 along cold side surface 136. Bosses 128 thereby locally increase a thickness of perimeter rail 126 in the regions of studs 130. Studs 130 are disposed inward from an outermost edge of perimeter rail 126 such that a sealing surface of perimeter rail 126 is maintained. In some examples, a portion of bosses 128 can separate the interior edge of perimeter rail 126 from the outer diameter of studs 130 while maintaining proximity between the outer diameter of studs 130 and the outer edge of perimeter rail 126 and panel 106. For example, studs 130 can be spaced from the outer edge of perimeter rail 126 by about 0.020 to 0.060 inches (0.51 to 1.5 mm) or up to about a maximum thickness of perimeter rail 126, the maximum thickness not exceeding a height of perimeter rail 126.

Bosses 128 can have a height equal to a height of perimeter rail 126 such that an outer surface of bosses 128 is flush with perimeter rail 126. Bosses 128 are configured to interface with inner surface 148 of outer shell 104. In assembly, panel 106 is pulled tightly to outer shell 104 by attachment feature 110. Perimeter rail 126 can react out the stud load against outer shell 104. The load applied in fastening panel 106 to outer shell 104 at varying locations along perimeter rail 126 helps create an air seal around panel 106.

Studs 130 can be spaced at varying distances along perimeter rail 126. As shown in FIG. 3, studs 130 can be asymmetrically arranged around perimeter rail 126. This asymmetric arrangement can ensure studs 130 of adjacent panels 106 are circumferentially or axially offset or staggered as discussed further herein. Studs 130 can be provided along perimeter rail 126 at each of forward end 140 and aft end 142 as shown in FIG. 3. In some embodiments, studs 130 can be provided along perimeter rail 126 at each of forward end 140, aft end 142, and opposing circumferential ends 144 and 146. Studs 130 can be offset from corners of panel 106 as shown in FIG. 3. In other embodiments, studs 130 can be provided along perimeter rail 126 at one or more corners of panels 106. The number and location of studs 130 can be selected to provide an air seal around panel 106 and to offset studs 130 of one panel 106 from studs 130 of circumferentially or axially adjacent panels 106.

Integrating studs 130 with perimeter rail 126 improves durability of panels 106. Placement of studs 130 along perimeter rail 126 reduces dirt collection zones and thereby improves long-term cooling of panels 106. Additionally, placement of studs 130 along perimeter rail 126 leaves open the space defined by perimeter rail 126 for generally unrestricted film cooling hole arrangements, which can further improve cooling of panel 106. Placement of studs 130 along perimeter rail 126 can also increase stiffness of the support structure and improve scaling with outer shell 104. Finally, integrating studs 130 with perimeter rail 126 can reduce a thermal load at a base of studs 130, thereby reducing cooling needs in the region of studs 130.

Figure 5:
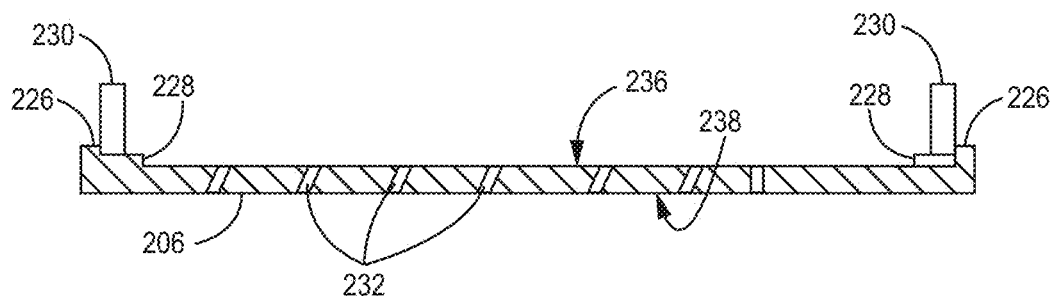
FIG. 5 is a schematic cross-sectional view of another example of a liner panel for a combustor of a gas turbine engine.

FIG. 5 is a schematic cross-sectional view of another embodiment of panel 106 of FIG. 2. FIG. 5 shows panel 206, perimeter rail 226, bosses 228, studs 230, film cooling holes 232, cold side surface 236, and hot side surface 238. Panel 206 can be substantially similar to panel 106 with studs 230 integrated with perimeter rail 226. As illustrated in FIG. 5, studs 230 are disposed adjacent to and connected to perimeter rail 226 via bosses 228. An outer diameter of studs 230 can be disposed on a tangent of an interior edge of perimeter rail 226. As described with respect to bosses 128 of FIG. 3, bosses 228 extend outward from cold side surface 236 and can be provided to locate studs 230 along perimeter rail 226. Bosses 228 are provided at a base of studs 230. Bosses 228 can surround or and can extend outward from studs 230 (e.g., having a perimeter extending beyond the diameter of studs 230) along cold side surface 236. Bosses 228 thereby locally increase a thickness of perimeter rail 226. Studs 230 are disposed inward from an outermost edge of perimeter rail 226 such that a sealing surface of perimeter rail 226 is maintained. In some examples, a portion of bosses 228 can separate the interior edge of perimeter rail 226 from the outer diameter of studs 230 while maintaining proximity between the outer diameter of studs 230 and the outer edge of perimeter rail 226 and panel 106, as described with respect to bosses 128 and studs 130.

In contrast to bosses 128 of FIG. 3, bosses 228 have a height less than a height of perimeter rail 226 such that perimeter rail 226 extends outward from bosses 228 toward outer shell 104. The height of bosses 228 can be, for example, 0.005-0.010 inches (0.127-0.254 mm) less than the height of perimeter rail 226. In combination with perimeter rail 226, bosses 228 can be configured to interface with inner surface 148 of outer shell 104. In this manner, bosses 228 provide local depressions along the interior edge of perimeter rail 226. In assembly, panel 206 is pulled tightly to outer shell 104 by attachment feature 110, such that outer shell 104 is locally deformed in the region of the depressed bosses 228 as outer shell 104 is clamped against bosses 228. As previously described, perimeter rail 226 can react out the stud load against outer shell 104. The depressed bosses 228 allow for additional clamping force to be generated at studs 230, which can improve the air seal formed around panel 206 by perimeter rail 226.

Figure 6:
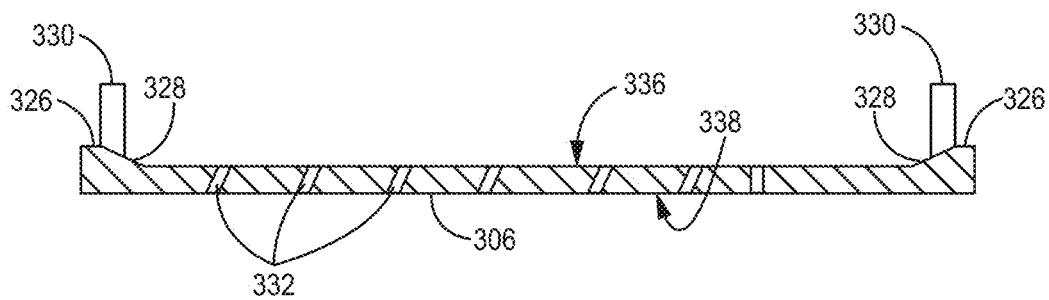
FIG. 6 is a schematic cross-sectional view of yet another example of a liner panel for a combustor of a gas turbine engine.

FIG. 6 is a schematic cross-sectional view of yet another embodiment of panel 106 of FIG. 2. FIG. 6 shows panel 306, perimeter rail 326, sloped walls 328, studs 330, film cooling holes 332, cold side surface 336, and hot side surface 338. Panel 306 can be substantially similar to panels 106 and 206 of FIGS. 3 and 4, with studs 330 integrated with perimeter rail 326. As illustrated in FIG. 6, studs 330 are disposed adjacent to and connected to perimeter rail 326 by sloped walls 328. An outer diameter of studs 330 can be disposed on a tangent of an interior edge of perimeter rail 326. Sloped walls 328 can extend from a top of perimeter rail 326 to cold side surface 336. As described with respect to bosses 128 of FIG. 3, sloped walls 328 can be provided to locate studs 330 along perimeter rail 326. Sloped walls 328 are provided at a base of studs 330. Sloped walls 328 can surround or can extend outward from studs 330 (e.g., having a perimeter extending beyond the diameter of studs 330) along cold side surface 336. Sloped walls 328 can be provided locally around studs 330 (similar to bosses 128 and 228) or can extend fully around panel 306. Studs 330 are disposed inward from an outermost edge of perimeter rail 326 such that a sealing surface of perimeter rail 326 is maintained. The sealing surface can be oriented parallel to cold side surface 336 and outer shell 104. Sloped walls 328 can extend from an interior edge of perimeter rail 326 (i.e., sloped walls 328 can extend inward from the sealing surface). In some examples, a portion of bosses 328 can separate the interior edge of perimeter rail 326 from the outer diameter of studs 330 while maintaining proximity between the outer diameter of studs 330 and the outer edge of perimeter rail 326 and panel 106, as described with respect to bosses 128 and studs 130.

In combination with the sealing surface of perimeter rail 326, sloped walls 328 can be configured to interface with inner surface 148 of outer shell 104. In this manner, sloped walls 328 provide local depressions in an innermost perimeter of perimeter rail 326. In assembly, panel 306 is pulled tightly to outer shell 104 by attachment feature 110 such that outer shell 104 is locally deformed in the region of the sloped walls 328 as outer shell 104 is clamped against sloped walls 328. As previously described, perimeter rail 326 can react out the stud load against outer shell 104. Sloped walls 328 allow for additional clamping force to be generated at studs 330, which can improve the air seal formed around panel 306 by perimeter rail 326. Sloped walls 328 can be disposed at an angle relative to cold side surface 336 selected to support studs 330 and attachment feature 110 and to provide a desired clamping force against perimeter rail 326 to form an air seal with outer wall 104.

In some embodiments, sloped walls 328 can extend from the sealing surface of perimeter rail 326 to cold side surface 336 as shown in FIG. 6. In alternative embodiments, sloped walls 328 can be joined to cold side surface 336 by a wall (not shown) extending perpendicular to cold side surface 336. For example, perimeter rail 326 can be locally defined by a sealing surface at an outermost side, a sloped surface 328 from which stud 330 projects, and a connecting wall extending substantially perpendicular to cold side surface 336 and connecting sloped surface 328 to cold side surface 336.

Figure 7:
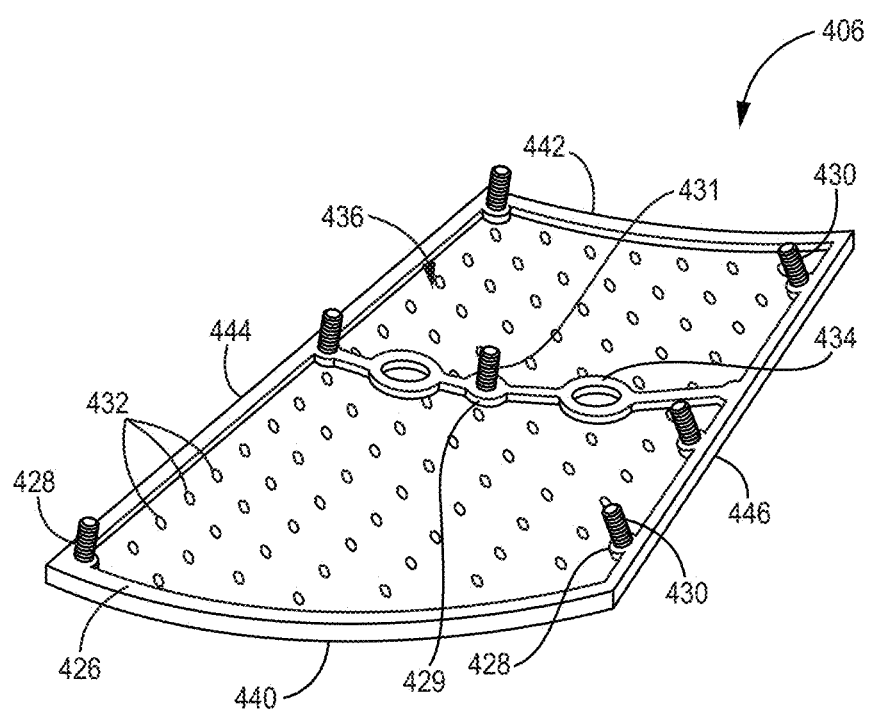
FIG. 7 is a perspective view of yet another liner panel for a combustor of a gas turbine engine.

FIG. 7 is a perspective view of yet another embodiment of panel 106 of FIG. 2. FIG. 7 shows panel 406, perimeter rail (or wall) 426, bosses 428 and 429, studs 430 and 431, film cooling holes 432, dilution holes 434, cold side surface 436, forward end 440, aft end 442, and opposing circumferential ends 444 and 446. Panel 406 can be substantially similar to panel 106 with studs 430 integrated with perimeter rail 426. Panel 406 can define a portion of the inner diameter of combustor 56, mounted to inner shell 102. Panel 406 includes a plurality of dilution holes 434 arranged in a circumferential row extending between opposing circumferential ends 444 and 446, as known in the art. Boss 429 can separate adjacent dilution holes 434. Stud 431 can be located on boss 429.

Bosses 428 can be substantially similar to bosses 128 of FIG. 3, extending outward from cold side surface 436 along perimeter rail 426 to a height equal to perimeter rail 426 such that an outermost surface of bosses 428 is flush with an outermost surface of perimeter rail 426. Bosses 428 are provided at a base of studs 430. Bosses 428 can surround or can extend outward from studs 430 (e.g., having a perimeter extending beyond the diameter of studs 430) along cold side surface 436. Bosses 428 thereby locally increase a thickness of perimeter rail 426. In other embodiments, bosses 428 can have a height less than a height of perimeter rail 426 similar to bosses 228 of FIG. 5. In yet other embodiments, bosses 428 can be replaced with sloped walls as provided on panel 306 of FIG. 6 and described with respect thereto. Studs 430 are disposed inward from an outermost edge of perimeter rail 426 such that a sealing surface of perimeter rail 426 is maintained.

Bosses 428 can be configured to interface with an inner surface (i.e., surface facing combustion chamber 108 in FIG. 2) of inner shell 102. In assembly, panel 406 is pulled tightly to inner shell 102 by attachment feature 110. As previously described, perimeter rail 426 can react out the stud load against inner shell 102. In embodiments in which bosses 428 are depressed from perimeter rail 426 or replaced with sloped walls, inner shell 102 can locally deform in the region of studs 430 as attachment feature 110 exerts a clamping force against the depressed bosses or sloped walls. The clamping force applied against perimeter wall 426 by attachment feature 110 can cause perimeter rail 426 to from an air seal around panel 406 as previously described.

Stud 431 can be centrally located between adjacent dilution holes 434. Stud 431 can support an inner portion of panel 406 and help provide an air seal around dilution holes 434. Boss 429 can surround a base of stud 431 and can extend outward from cold side surface 436 to a height equal to a height of perimeter rail 426.

Studs 430 are substantially the same as studs 130 of FIG. 3, having threads configured to engage a retention nut of attachment feature 110. Studs 420 can be spaced at varying distances along perimeter rail 426. As shown in FIG. 7, studs 430 can be asymmetrically arranged around perimeter rail 426. The asymmetric arrangement can ensure studs 430 of adjacent panels 406 are circumferentially or axially offset as discussed further herein. Studs 430 can be provided along perimeter rail 426 at each of opposing circumferential ends 444 and 446 as shown in FIG. 7. In some embodiments, studs 430 can be provided along perimeter rail 426 at each of forward end 440, aft end 442, and opposing circumferential ends 444 and 446. Studs 430 can be offset from corners of panel 406 and/or can be provided along perimeter rail 426 at one or more corners of panel 406, as shown in FIG. 7. The number and location of studs 430 can be selected to provide an air seal around panel 406 and to offset studs 430 of one panel 406 from studs 430 of circumferentially adjacent panels 406 (or axially adjacent panels, e.g., forward or aft panels), as discussed further herein.

Figure 8:
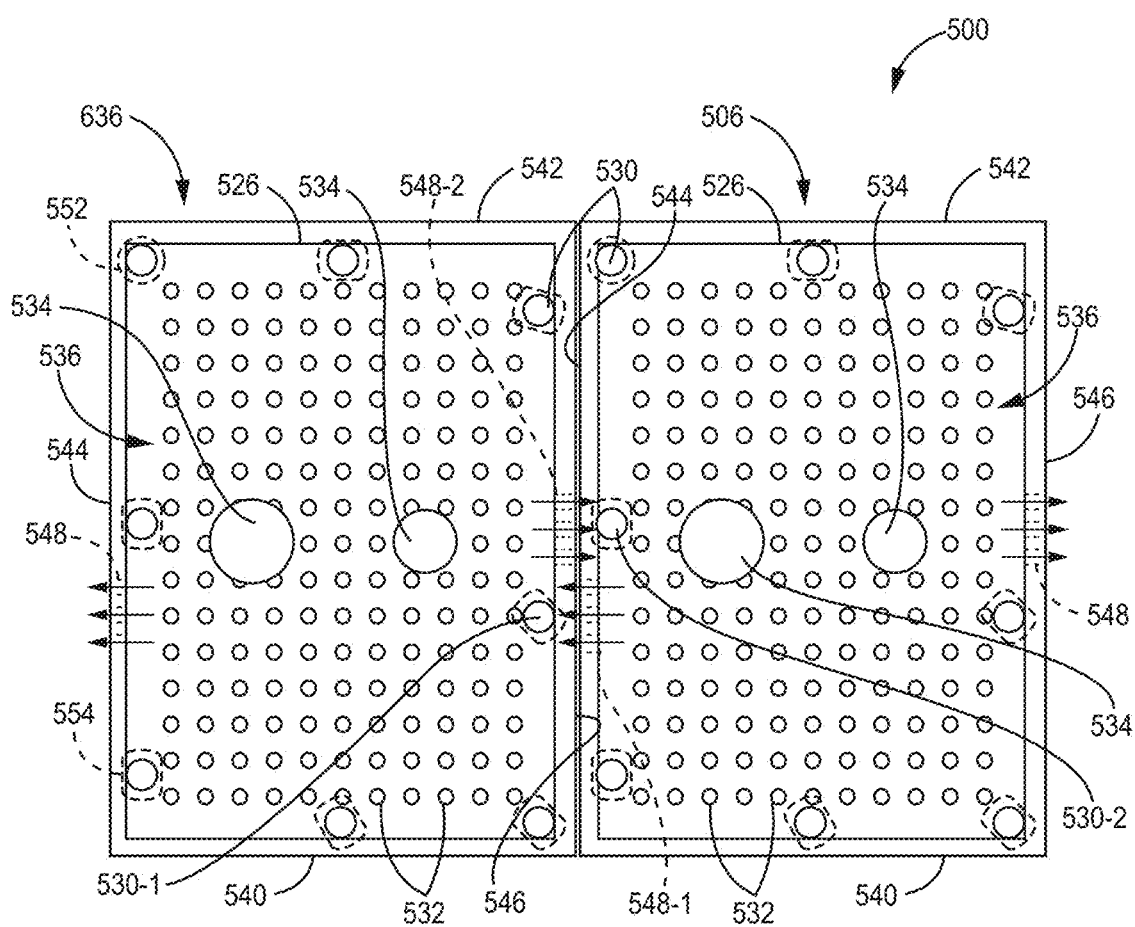
FIG. 8 is a schematic top view of a liner panel assembly for a combustor of a gas turbine engine.
Figure 9:
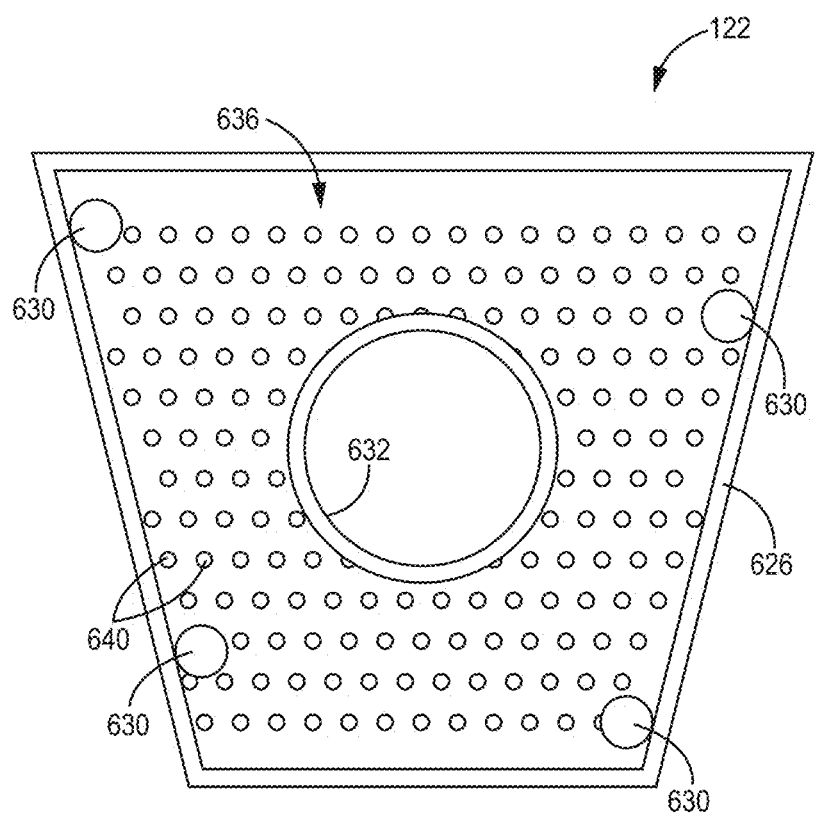
FIG. 9 is a schematic top view of a bulkhead liner for a combustor of a gas turbine engine.

FIG. 8 is a schematic top view of combustor panel assembly 500. FIG. 8 shows circumferentially adjacent panels 506. Adjacent panels 506 can be substantially identical, each having perimeter rail 526 with integrated studs 530. Panels 506 can be configured to be mounted to outer shell 104 (shown in FIG. 2). FIG. 8 shows panels 506, perimeter rails 526, studs 530, film cooling holes 532, dilution holes 534, cold side surfaces 536, forward ends 540, aft ends 542, opposing circumferential ends 544 and 546, and rail cooling holes 548. FIG. 8 additionally shows mounting holes 552 and 554 (shown in phantom), which are provided in outer shells 104 to receive studs 530.

Perimeter rails 526 extend from cold surfaces 536 and define a perimeter of panels 506, extending along forward ends 540, aft ends 542, and opposing circumferential ends 544 and 546. Perimeter rails 526 are configured to form a sealing interface with inner surface 148 of outer shell 104 as previously described.

Studs 530 project outward from and perpendicular to cold side 536. Studs 530 can include threads configured to engage attachment features 106 as previously described. Studs 530 can be integrated with perimeter rail 526 using any of means previously described, including bosses that are flush with perimeter rail 526, bosses that are depressed from perimeter rail 526, and sloped walls, as described with respect to FIGS. 4, 5, and 6, respectively.

Panels 506 are arranged such that circumferential end 544 of one panel 506 is disposed adjacent to circumferential end 546 of the adjacent panel 506. Studs 530 are asymmetrically arranged around perimeter rail 526 such that studs 530 disposed on circumferential end 544 are axially offset with respect to engine axis A (shown in FIG. 1) from studs 530 disposed on circumferential end 546 of the adjacent panel 506. In this manner, studs 530 disposed along immediately adjacent perimeter rails 526 are staggered. Axially offsetting or staggering studs 530 in this manner provides space for rail cooling holes 548, which can be configured to direct cooling air from cooling plenum 107 (shown in FIGS. 2 and 4) defined between panels 506 and outer shell 104 toward studs 530 on an immediately adjacent panel 506 (direction of cooling flow illustrated by arrows).

Rail cooling holes 548 are provided through perimeter rail 526. Rail cooling holes 548 can extend along a tangent to the curvature of cold side surface 536. One or more rail cooling holes 548 can be provided on circumferential end 544 to direct cooling air toward a region of an adjacent stud 530 on an adjacent panel 506 and one or more rail cooling holes 548 can be provided on circumferential end 546 to direct cooling air toward a region of an adjacent stud 530 on an adjacent panel 506. For example, as shown in FIG. 8, one or more cooling holes 548-1 can be axially aligned with stud 530-1 on an adjacent panel 506 and one or more cooling holes 548-2 can be axially aligned with stud 530-2 on an adjacent panel 506. Cooling air provided through rail cooling holes 548 can impinge on the adjacent panel 506 in the region of studs 530 (e.g., 530-1 and 530-2). While only one set of rail cooling holes 548 is shown on each of circumferential end 544 and circumferential end 546, panels 506 can include a plurality of rail cooling holes 548 (or sets of rail cooling holes 548) axially aligned with a plurality of studs 530 on a circumferentially adjacent panel 506.

Rail cooling holes 548 can also be provided on forward ends 540 and/or aft ends 542 to direct impingement cooling air toward panels disposed adjacent to forward ends 540 and/or aft ends 542. Rail cooling holes 548 provided on forward ends 540 and/or aft ends 542 can be circumferentially aligned with adjacent studs in the axially adjacent panels. The number, positioning, and size of rail cooling holes 548 on each panel 506 can be selected based on the thermal load in the regions of studs 530 on adjacent panels, a height of perimeter rail 526, and film cooling requirements on panel 506.

As shown in FIG. 8, a set of rail cooling holes 548 can be provided to impinge on a region of a stud 530. In other embodiments, a single rail cooling hole 548 may be provided for each adjacent stud. Rail cooling holes 548 provided at circumferential ends 544 and 546 can extend circumferentially (orthogonal to engine axis A) through perimeter rail 526 or at an angle as desired to cool a thermal load. Similarly, rail cooling holes 548 provided on forward and/or aft ends 540, 542 can extend axially (parallel to engine axis A) or at an angle. Rail cooling holes 438 can be formed, for example, by laser jet, water jet, laser-guided water jet, and other suitable methods known in the art.

Mounting holes 552 and 554 are configured to accommodate thermal growth mismatch of panels 506 and outer shell 104. Mounting hole 552 can be a circular hole configured to set and retain a position of panels 506 on outer shell 104. Mounting hole 552 can have a diameter slightly larger than a diameter of stud 520 to allow for thermal growth of stud 520. Mounting holes 554 can be oversized to allow for thermal growth of panels 506. As shown in FIG. 8, mounting holes 554 can be rectangular or oblong slots with a longitudinal component oriented to align with mounting hole 552 to accommodate thermal growth outward from mounting hole 552.

FIG. 9 is a schematic top view of bulkhead panel 122 according to one embodiment of the present disclosure. FIG. 9 shows perimeter rail 626, studs 630, port 632, cold side surface 636, and pin fins or pedestals 640. Port 632 is configured to receive a portion of fuel nozzle assembly 120 (shown in FIG. 2), as known in the art. Pin fins 640 can be provided to enhance cooling of bulkhead panel 122. In other embodiments, bulkhead panels 122 can include film cooling holes for cooling bulkhead panel 122 as previously described, for example, with respect to film cooling holes 132 of panels 106. Perimeter rail 626 extends from cold surface 636 and defines a perimeter of bulkhead panels 122. Perimeter rail 626 is configured to form a sealing interface with an inner surface of bulkhead support shell 104. Studs 630 project outward from and perpendicular to cold side 636. Studs 630 can include threads configured to engage attachment features (not shown) similar to attachment features 110 shown in FIG. 2. Studs 630 can be integrated with perimeter rail 626 using any of means previously described, including bosses that are flush with perimeter rail 626, bosses that are depressed from perimeter rail 626, and sloped walls, as described with respect to FIGS. 4, 5, and 6, respectively.

Integrating studs with perimeter rails as disclosed herein can improve durability of combustor panels by reducing dirt collection zones, increasing stiffness in the attachment area, improving perimeter seals, maximizing available space for film cooling holes, and reducing the thermal load at the base of the studs.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

In one aspect, a panel for lining a combustor shell of a combustor of a gas turbine engine includes a front surface configured to face a combustion chamber and a back surface configured to face the combustor shell, a plurality of cooling holes extending from the back surface to the front surface, a rail extending from the back surface and defining a perimeter of the panel, and a plurality of studs disposed adjacent to and connected to the rail. The rail is configured to contact the combustor shell. The plurality of studs is configured to be received in a plurality of holes of the combustor shell. Studs of the plurality of studs are asymmetrically arranged around the perimeter of the panel.

The panel of the preceding paragraph can optionally include, additionally and/or alternatively, any one or more of the following features, configurations, and/or additional components:

In an embodiment of the preceding panel, the rail can have an outer surface that slopes inward from an edge of the perimeter to the back surface of the panel and the plurality of studs can be disposed on the outer surface.

In an embodiment of any of the preceding panels, each stud of the plurality of studs can be connected to the rail by a boss.

In an embodiment of any of the preceding panels, a height of the boss can be equal to a height of the rail.

In an embodiment of any of the preceding panels, a height of the boss can be less than a height of the rail.

In an embodiment of any of the preceding panels, the panel can include a plurality of dilution holes.

In an embodiment of any of the preceding panels, the panel can be a bulkhead panel configured to receive a fuel nozzle or portion thereof.

In another aspect, a combustor of a gas turbine engine includes a support shell having an inner surface and an outer surface and a plurality of mounting holes extending from the inner surface to outer surface and a plurality of panels. The panels includes a front surface facing a combustion chamber and a back surface facing the inner surface of the support shell, a plurality of cooling holes extending from the back surface to the front surface, a rail extending from the back surface and defining a perimeter of the panel, and a plurality of studs disposed adjacent to and connected to the rail. The rail is configured to contact the inner surface of the support shell. The plurality of studs is received in the plurality of mounting holes of the support shell and fixed to the outer surface of the support shell by a plurality of attachment members. Studs of the plurality of studs are asymmetrically arranged around the perimeter of the panel.

The combustor of the preceding paragraph can optionally include, additionally and/or alternatively, any one or more of the following features, configurations, and/or additional components:

In an embodiment of the preceding combustor, adjacent panels of the plurality of panels can have adjacent rails and studs connected to adjacent rails can be circumferentially or axial offset.

In an embodiment of any of the preceding combustors, adjacent rails can include impingement cooling holes with impingement cooling holes of one of the adjacent rails directed toward a location of a stud on the other of the adjacent rails.

In an embodiment of any of the preceding combustors, the rail can have an outer surface that slopes inward from an edge of the perimeter to the back surface of the panel and the plurality of studs can be disposed on the outer surface.

In an embodiment of any of the preceding combustors, each stud of the plurality of studs can be connected to the rail by a boss.

In an embodiment of any of the preceding combustors, the boss can have a height equal to the rail.

In an embodiment of any of the preceding combustors, the boss can have a height less than the rail.

In an embodiment of any of the preceding combustors, the panel can include a plurality of dilution holes.

In an embodiment of any of the preceding combustors, the panel can be a bulkhead panel configured to receive a fuel nozzle or portion thereof.

The invention claimed is:

1. A panel for lining a combustor shell of a combustor of a gas turbine engine, the panel comprising:
   a front surface and a back surface, the front surface configured to face a combustion chamber and the back surface configured to face the combustor shell;
   a plurality of cooling holes extending from the back surface to the front surface;
   a rail extending from the back surface and defining a perimeter of the panel, the rail configured to contact the combustor shell; and
   a plurality of studs disposed adjacent to and connected to the rail, the plurality of studs configured to be received in a plurality of holes of the combustor shell;

wherein the plurality of studs is asymmetrically arranged around the perimeter of the panel
wherein the rail comprises an outer surface that slopes inward from an edge of the perimeter to the back surface of the panel and wherein the plurality of studs is disposed on the outer surface.

2. The panel of claim 1, wherein the panel comprises a plurality of dilution holes.

3. The panel of claim 1, wherein the panel is a bulkhead panel configured to receive a fuel nozzle or portion thereof.

4. A combustor for a gas turbine engine, the combustor disposed about an axis and comprising:
   a support shell having an inner surface and an outer surface and a plurality of mounting holes extending from the inner surface to the outer surface; and
   a plurality of panels, each panel comprising:
      a front surface and a back surface, the front surface facing a combustion chamber and the back surface facing the inner surface of the support shell;
      a plurality of cooling holes extending from the back surface to the front surface;
      a rail extending from the back surface and defining a perimeter of the panel, the rail configured to contact the inner surface of the support shell; and
      a plurality of studs disposed adjacent to and connected to the rail, the plurality of studs received in the plurality of mounting holes of the support shell and fixed to the outer surface of the support shell by a plurality of attachment members;
   wherein the plurality of studs is asymmetrically arranged around the perimeter of the panel;
   wherein the rail has a rail outer surface that slopes inward from an edge of the perimeter to the back surface of the panel and wherein the plurality of studs is disposed on the rail outer surface.

5. The combustor of claim 4, wherein adjacent panels of the plurality of panels have adjacent rails and wherein studs of the plurality of studs connected to the adjacent rails are circumferentially or axially offset.

6. The combustor of claim 5, wherein the adjacent rails comprise impingement cooling holes, the impingement cooling holes of one of the adjacent rails are directed toward a location of a stud on the other of the adjacent rails.

7. The combustor of claim 4, wherein the panel comprises a plurality of dilution holes.

8. The combustor of claim 4, wherein the panel is a bulkhead panel configured to receive a fuel nozzle or portion thereof.

* * * * *